US009092782B1

(12) United States Patent
Zaslavsky et al.

(10) Patent No.: US 9,092,782 B1
(45) Date of Patent: Jul. 28, 2015

(54) METHODS AND APPARATUS FOR RISK EVALUATION OF COMPROMISED CREDENTIALS

(75) Inventors: Alex Zaslavsky, Petah Tikva (IL); Alon Kaufman, Bnei-Dror (IL); Yael Villa, Tel-Aviv (IL); Marcelo Blatt, Modiin (IL); Alex Vaystikh, Hod Hasharon (IL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/537,506

(22) Filed: Jun. 29, 2012

(51) Int. Cl.
*G06F 21/00* (2013.01)
*G06Q 20/40* (2012.01)

(52) U.S. Cl.
CPC .................................. *G06Q 20/4016* (2013.01)

(58) Field of Classification Search
CPC ........... G06Q 20/4016; G06Q 10/0635; H04L 63/1433; H04L 63/1416; G06F 21/577
See application file for complete search history.

(56) References Cited

U.S. PATENT DOCUMENTS

| | | | |
|---|---|---|---|
| 8,015,604 B1* | 9/2011 | Tidwell et al. ................... 726/22 |
| 8,056,130 B1* | 11/2011 | Njemanze et al. ............... 726/22 |
| 8,141,157 B2* | 3/2012 | Farley et al. ..................... 726/24 |
| 8,230,505 B1* | 7/2012 | Ahrens et al. ................... 726/23 |
| 8,528,091 B2* | 9/2013 | Bowen et al. .................... 726/24 |
| 8,769,684 B2* | 7/2014 | Stolfo et al. ..................... 726/23 |
| 8,819,825 B2* | 8/2014 | Keromytis et al. .............. 726/24 |
| 2003/0154396 A1* | 8/2003 | Godwin et al. ................ 713/201 |
| 2005/0116025 A1* | 6/2005 | Davis ............................. 235/380 |
| 2006/0265746 A1* | 11/2006 | Farley et al. ..................... 726/22 |
| 2006/0282660 A1* | 12/2006 | Varghese et al. .............. 713/155 |
| 2007/0073630 A1* | 3/2007 | Greene et al. ................... 705/80 |
| 2008/0016569 A1* | 1/2008 | Hammer et al. ................. 726/23 |
| 2008/0140576 A1* | 6/2008 | Lewis et al. ..................... 705/67 |
| 2009/0222369 A1* | 9/2009 | Zoldi et al. ...................... 705/35 |
| 2009/0242629 A1* | 10/2009 | Davis ............................. 235/380 |
| 2009/0300589 A1* | 12/2009 | Watters et al. ................. 717/140 |
| 2010/0057622 A1* | 3/2010 | Faith et al. ...................... 705/71 |
| 2010/0169192 A1* | 7/2010 | Zoldi et al. ...................... 705/30 |
| 2011/0214187 A1* | 9/2011 | Wittenstein et al. ............ 726/25 |
| 2011/0225142 A1* | 9/2011 | McDonald ..................... 707/710 |
| 2011/0270752 A1* | 11/2011 | Neto et al. ....................... 705/44 |
| 2011/0276468 A1* | 11/2011 | Lewis et al. ..................... 705/38 |
| 2012/0233698 A1* | 9/2012 | Watters et al. .................. 726/25 |
| 2012/0239557 A1* | 9/2012 | Weinflash et al. .............. 705/39 |
| 2012/0255022 A1* | 10/2012 | Ocepek et al. .................. 726/25 |
| 2012/0290712 A1* | 11/2012 | Walter et al. .................. 709/224 |
| 2012/0297484 A1* | 11/2012 | Srivastava ....................... 726/23 |
| 2012/0324551 A1* | 12/2012 | Bretschneider et al. .......... 726/5 |
| 2013/0133072 A1* | 5/2013 | Kraitsman et al. .............. 726/23 |
| 2014/0007238 A1* | 1/2014 | Magee et al. .................... 726/24 |
| 2014/0012724 A1* | 1/2014 | O'leary et al. .................. 705/35 |

OTHER PUBLICATIONS

RSA Press Release, New RSA FraudAction Anti-Trojan Service to Provide Institutions with Comprehensive Crimeware Protection (Mar. 15, 2007) (available at www.rsa.com/press_release).*
Thorsten Holz et al., Learning More About the Underground Economy: A Case-Study of Keyloggers and Dropzones, in Proceedings of the 14th European Conference on Research in Computer Security 1-18 (2009).*
Martin Apel et al., Towards Early Warning Systems—Challenges, Technologies and Architecture, in Proceedings of the 4th International Conference on Critical Information Infrastructures Security 151-164 (2009).*
Marco Cova et al., An Analysis of Rogue AV Campaigns, in Proceedings of the 13th International Conference on Recent Advances in Intrusion Detection 442-463 (2010).*

* cited by examiner

*Primary Examiner* — Taghi Arani
*Assistant Examiner* — Sharon Lynch
(74) *Attorney, Agent, or Firm* — Ryan, Mason & Lewis, LLP

(57) ABSTRACT

Techniques are provided for evaluating compromised credential information. A method for evaluating compromised credentials comprises the steps of: collecting data regarding previously compromised credentials that were used to commit an unauthorized activity; applying one or more statistical learning methods to the collected data to identify one or more patterns; and evaluating a risk of credentials that have been compromised by one or more attackers using the identified patterns. According to a further aspect of the invention, a risk score is generated for one or more users and devices. The risk scores are optionally ordered based on an order of risk. The data can be collected, for example, from one or more of anti-fraud servers and information sources.

17 Claims, 5 Drawing Sheets

METHODS AND APPARATUS FOR RISK EVALUATION OF COMPROMISED CREDENTIALS

FIELD

The present invention relates to techniques for evaluating credential data that is compromised by malicious software.

BACKGROUND

Malicious software (often referred to as "malware") is used by an attacker to gather sensitive information, disrupt computer operation and/or gain access to private computer systems. Malware includes computer viruses, Trojan horses, worms and other malicious programs. Malware affects many industries, including finance, healthcare, government, insurance, telecommunications and education. Malware silently captures a wide variety of data and credentials in malware log files from online users, including critical business information. Accordingly, organizations must establish policies and controls to protect enterprise information from malware.

A number of techniques have been proposed or suggested for the collection, monitoring and/or notification of compromised credentials for enterprises. Existing services primarily deal with collecting compromised credential records and presenting them for review by enterprise users. Given the high volume of compromised credential data, however, enterprises are often overwhelmed by the amount of compromised credential information that must be processed and cannot perform a detailed investigation of such records. In addition, the actions that need to be performed in response to such compromises may not be clear.

A need therefore exists for proactive techniques for evaluating compromised credential information based on machine learning and pattern recognition methods to meet the needs of enterprises and/or other users. A further need exists for techniques for identifying the most valuable records (e.g., most vulnerable accounts) for further detailed investigation.

SUMMARY

Embodiments of the present invention provide improved techniques for evaluating compromised credential information. In one embodiment, a method for evaluating compromised credentials comprises the steps of: collecting data regarding previously compromised credentials that were used to commit an unauthorized activity; applying one or more statistical learning methods to the collected data to identify one or more patterns; and evaluating a risk of credentials that have been compromised by one or more attackers using the identified patterns. According to a further aspect of the invention, a risk score is generated for one or more users and devices. The risk scores are optionally ordered based on an order of risk.

In one exemplary embodiment, the data is collected from one or more of anti-fraud servers and information sources. The collected data comprises, for example, one or more of attributes of malware used by an attacker to obtain the previously compromised credentials; attributes of a drop where an attacker stored the previously compromised credentials; attributes of a device from where the previously compromised credentials were obtained; attributes of the unauthorized activity.

Advantageously, illustrative embodiments of the invention provide techniques for evaluating compromised credential records based on machine learning and pattern recognition methods. These and other features and advantages of the present invention will become more readily apparent from the accompanying drawings and the following detailed description.

DETAILED DESCRIPTION

The present invention provides techniques for evaluating compromised credential records based on machine learning and pattern recognition methods. According to one aspect of the invention, credential risk assessment techniques are provided for compromised/stolen personal and corporate credential data. In this manner, the most valuable records (e.g., most vulnerable accounts) can be identified for further detailed investigation. In one exemplary implementation, compromised credential records are organized in decreasing order of risk in order to present the most compromised credentials first (e.g., those credentials with high probability to have malicious activity performed on their behalf). In this manner, the risk ranking increases the efficiency and directs the actions required by organizations and/or users upon detection of compromised credentials.

According to a further aspect of the invention, a statistical approach is employed using machine learning methodology to perform compromised credential risk evaluation based on a number of criteria (dimensions). As discussed hereinafter, by correlating various data elements known on each compromised record, records can be identified that are likely to be used for fraudulent activities, such as financial exploitation or theft of medical records.

In one exemplary embodiment, a ranked list of compromised credentials is generated that provides users with an improved ability to act upon the stolen credentials. For example, if a bank receives a ranked list of compromised accounts; the bank can apply the following exemplary policy:

Very high risk compromised accounts—deny automatic money movement;

High risk compromised accounts—add additional authentication to money movements;

Medium risk compromised accounts—limit sum of money that can be moved;

Low risk compromised accounts—apply monitoring to accounts; and

Very low risk compromised accounts—ignore the fact that credentials were stolen.

Figure 1:
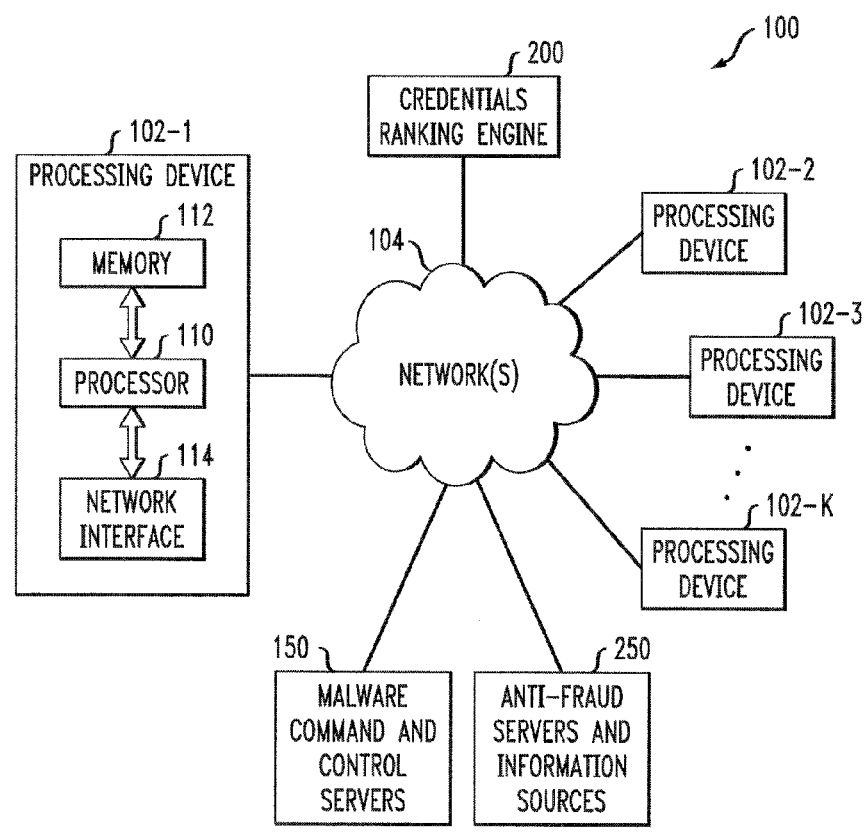
FIG. 1 illustrates an exemplary network environment in which the present invention can be implemented.

FIG. 1 illustrates an exemplary network environment 100 in which the present invention can be implemented. As shown in FIG. 1, the exemplary network environment 100 comprises a plurality of processing devices denoted 102-1 through 102-K that communicate with one another over one or more networks 104. The network 104 may comprise any type of network, such as a WAN, a LAN, a satellite network, a telephone or cable network, or various portions or combinations of these and other types of networks.

The exemplary processing device 102-1 comprises a processor 110 coupled to a memory 112. The processor 110 may comprise a microprocessor, a microcontroller, an ASIC, an FPGA or other type of processing circuitry, as well as portions or combinations of such circuitry elements, and the memory 112, which may be viewed as an example of a "computer program product" having executable computer program code embodied therein, may comprise RAM, ROM or other types of memory, in any combination.

Also included in the processing device 102-1 is network interface circuitry 114, which is used to interface the processing device with the network 104 and other system components, and may comprise conventional transceivers.

The other processing devices 102-2 through 102-K are assumed to be configured in a manner similar to that shown for processing device 102-1 in FIG. 1.

As shown in FIG. 1, one or more malware command and control servers 150 are used by a malicious actor (attacker) when configuring malware. It is noted that the information obtained by malicious actors is often stored on a server referred to as a "drop point," which may be distinct from the malware command and control servers 150 used by the attacker.

According to one aspect of the present invention, a credentials ranking engine 200 is provided, as discussed further below in conjunction with FIG. 2. In addition, as discussed further below, the credentials ranking engine 200 interacts with one or more anti-fraud servers and information sources 250 to obtain information used to rank the compromised credentials.

Figure 2:
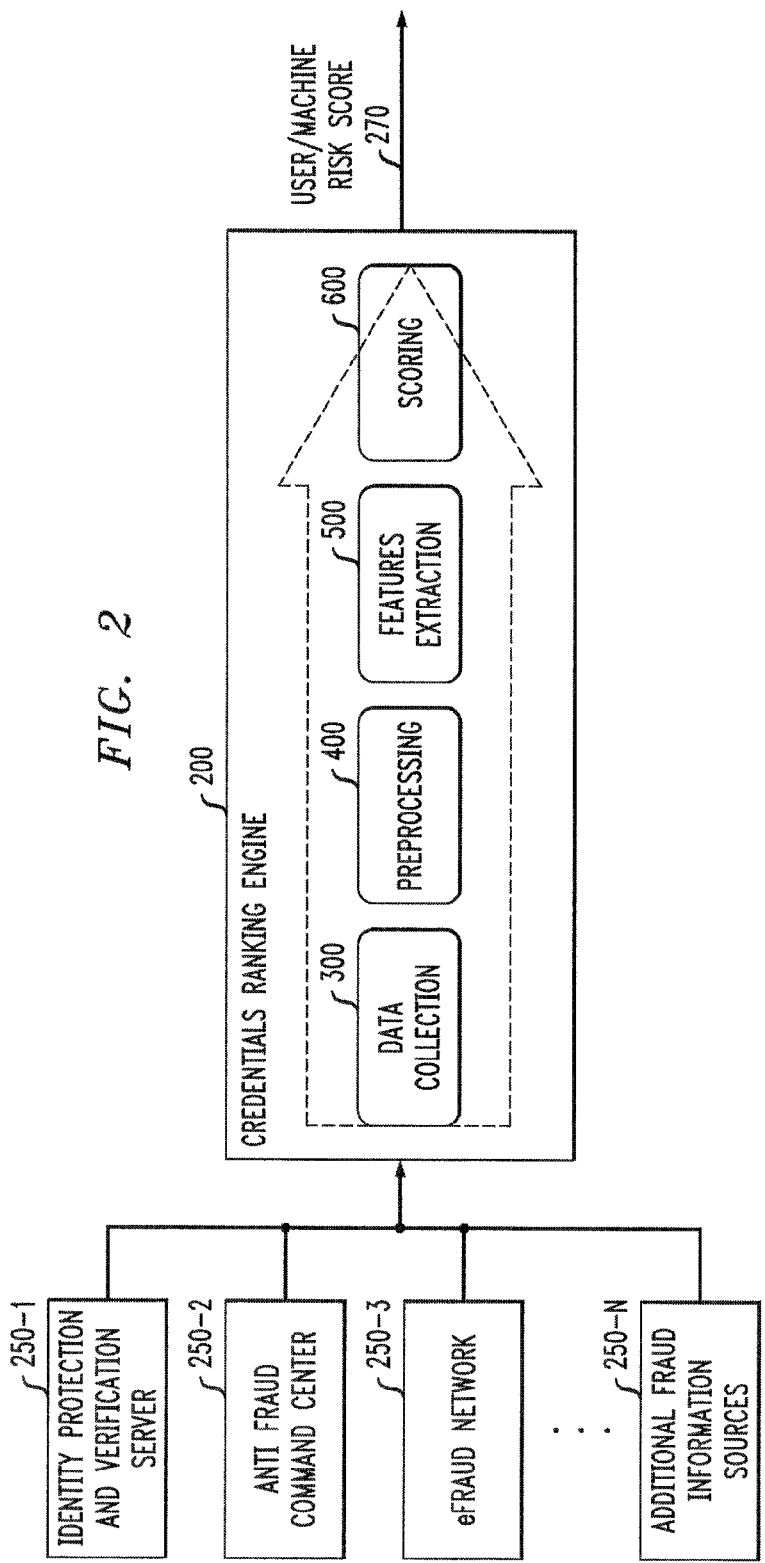
FIG. 2 is a block diagram illustrating the credentials ranking engine of FIG. 1 in further detail.

FIG. 2 is a block diagram illustrating the credentials ranking engine 200 of FIG. 1 in further detail. As shown in FIG. 2, the credentials ranking engine 200 obtains information used to rank the compromised credentials from one or more anti-fraud servers and information sources 250-1 through 250-N. In the exemplary embodiment of FIG. 2, anti-fraud servers and information sources 250 comprise an identity protection and verification server 250-1, an anti fraud command center 250-2, an eFraud network 250-3 and one or more additional fraud information sources 250-N.

Generally, the identity protection and verification server 250-1 can be embodied, for example, using RSA Identity Verification™, from RSA Security Inc. of Bedford, Mass., U.S.A. The identity protection and verification server 250-1 comprises authentication and fraud prevention services that validate user identities and reduce the risk associated with identity impersonation. The exemplary identity protection and verification server 250-1 confirms a user's identity in real time using dynamic knowledge-based authentication (KBA).

The anti fraud command center 250-2 can be embodied, for example, using RSA Anti-Fraud Command Center (AFCC) TM, from RSA Security Inc. of Bedford, Mass., U.S.A. The exemplary anti fraud command center 250-2 addresses online fraud threats such as phishing, pharming and Trojan attacks on behalf of customers.

The eFraud network 250-3 can be embodied, for example, using RSA eFraudNetwork from RSA Security Inc. of Bedford, Mass., U.S.A. The exemplary eFraud network 250-3 is a data repository of fraud profiles gleaned from RSA's worldwide network of customers, end users, and Internet service providers (ISPs) as well as from the RSA Antifraud Command Center 250-2 and third-party contributors. Generally, when an online fraud pattern or other cybercriminal activity is identified, the associated data, activity profile, and device fingerprints are moved to a shared data repository in the eFraud network 250-3 from which active network members receive updates on a regular basis. These ongoing updates enable real-time, proactive protection to online users.

In addition, as shown in FIG. 2, the credentials ranking engine 200 comprises a data collection stage 300, discussed further below in conjunction with FIG. 3; a preprocessing stage 400, discussed further below in conjunction with FIG. 4; features extraction stage 500, discussed further below in conjunction with FIG. 5; and a risk scoring stage 600, discussed further below in conjunction with FIG. 6.

Figure 3:
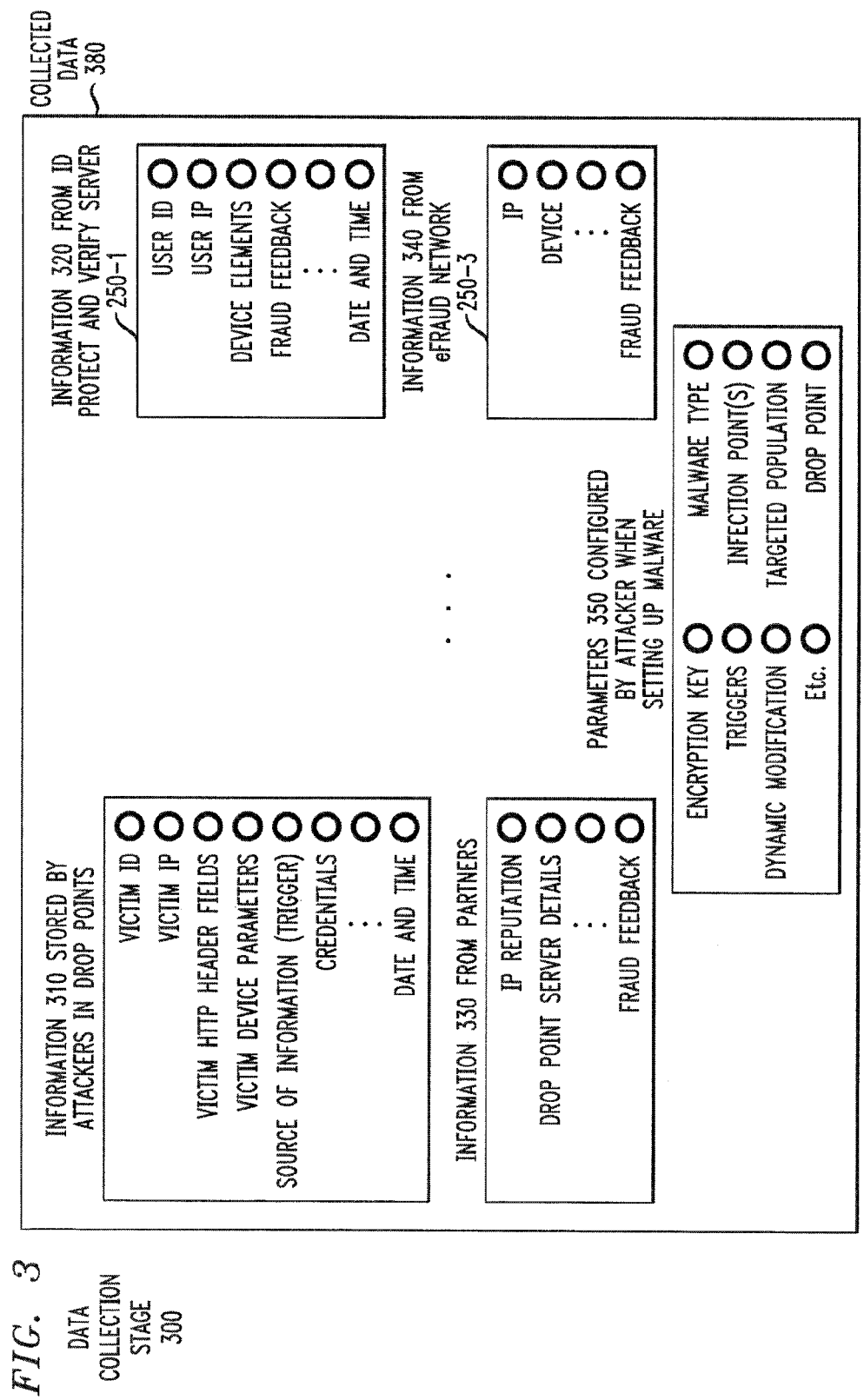
FIG. 3 illustrates the data collection stage of FIG. 2 in further detail.

FIG. 3 illustrates the data collection stage 300 of FIG. 2 in further detail. Generally, the data collected at stage 300 comes from one or more of the following sources: attributes of the malware; attributes of the drop zone; attributes of the device from which the credentials were compromised; credential information (including attack target); and the activity performed with the compromised credentials.

As shown in FIG. 3, the exemplary collected data 380 comprises information 310 stored by attackers in drop points; information 320 from the identity protection and verification server 250-1; information 330 from partners; information 340 from the eFraud network 250-3; and parameters 350 configured by the attacker when setting up the malware.

As shown in FIG. 3, the exemplary information 310 stored by attackers in drop points comprises:

Victim ID—the unique identifier that identified the current victim;

Victim IP Address;

Victim HTTP header fields;

Victim device parameters;

Source of information (trigger)—an indication of where the data was stolen from;

Credentials—the data that was actually stolen/compromised;

Date and Time—the time when the information 310 was recorded.

The exemplary information 320 from the identity protection and verification server 250-1 comprises a user identifier, a user IP address, a device elements list, fraud feedback on the "usage" of stolen credentials, and a date/time stamp. The exemplary information 330 from partners comprises the reputation of an IP address (e.g., the fraud history); drop point server details; and fraud feedback on the "usage" of stolen credentials.

As shown in FIG. 3, the exemplary information 340 from the eFraud network 250-3 comprises an IP address, a device identifier, and fraud feedback on the "usage" of stolen credentials. The exemplary parameters 350 configured by an attacker when setting up the malware comprise:

encryption key—the key to use when encrypting/decrypting, e.g., reading the configuration file, encrypting the stolen information file;

triggers—the type of information that should be stolen;

dynamic modification—changes what the user sees or interacts with, e.g., dynamically inject malicious code into specific websites that will execute on behalf of the user (e.g., automatically downloading a script that will initiate a money transfer command when the user logs into a triggered URL and the user's account status, such as balance, allows it);

Malware type—the malware type used;

infection point(s)/targeted population—a list of customers of one or more companies to target;

drop point—the server(s) where obtained information is sent; and update point—server(s) to retrieve information from, e.g., configuration updates.

When the collected data 380 is analyzed over time and across multiple datasets, new dimensions of insight are available. For example, by correlating all of the information about one victim with all of the information from all the other infected victims and previously seen fraud patterns, the following can be determined:

"Old Drop zones" (i.e., Drop zone age higher than a predefined threshold) with many compromised users and machines may consider being more risky because it can be assumed that the malicious actor behind the attack is a relatively sophisticated fraudster;

"Old compromised records" (i.e., record age higher than a predefined threshold) suggest a low probability that the fraudster will use old compromised records so the score can be gradually reduced for these records;

entities' drop zone targets (e.g., average number of new compromised credentials added per day to the drop zone and the average live time in the Internet Service Provider (ISP) hosting this malware) permit a prediction of how many users will be exposed to such fraud);

user velocities on infected machines can distinguish between personal and shared devices (this knowledge can be used to assign higher score to shared devices because there are potentially many users that are exposed to the malware); and tracking the actual fraud case activity for specific drop zones can lead to possible fraud scenarios for specific credentials.

Figure 4:
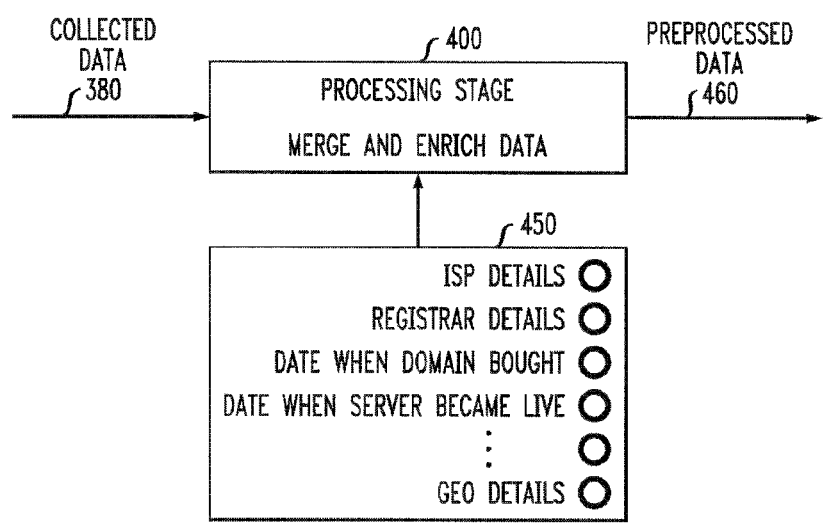
FIG. 4 illustrates the preprocessing stage of FIG. 2 in further detail.

FIG. 4 is a block diagram illustrating the preprocessing stage 400 of FIG. 2 in further detail. As shown in FIG. 4, the preprocessing stage 400 processes the exemplary data 380 collected by the data collection stage 300 to merge and enrich the collected data 380 to generate preprocessed data 460. The data is enriched, for example, using exemplary enrichment parameters 450, such as Internet Service Provider (ISP) details, domain registrar details, the date when the domain was obtained, the date the server became live, and geographic details.

Figure 5:
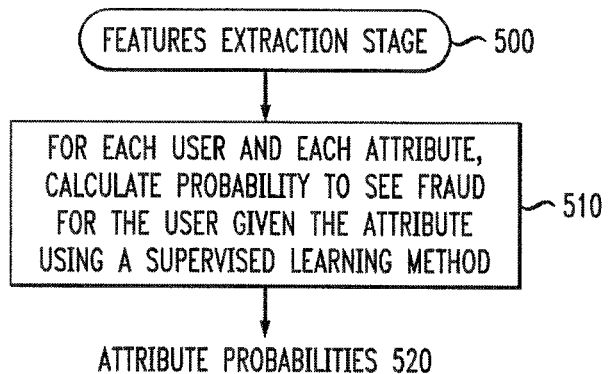
FIG. 5 is a flow diagram illustrating the features extraction stage of FIG. 2 in further detail.

FIG. 5 is a flow diagram illustrating the features extraction stage 500 of FIG. 2 in further detail. Generally, the features extraction stage 500 extracts features using discretization techniques, maximum likelihood techniques and principal components. As shown in FIG. 5, for each user and each attribute, the exemplary features extraction stage 500 calculates the probability to see a fraud for the user given the attribute during step 510, using a Supervised Learning Method, such as Bayes' theorem, as follows:

$$P(C = c \mid A = a) = P(C = c)\frac{P(A = a \mid C = c)}{P(A = a)},$$

where C indicates whether a compromise occurred (Yes/No) and A indicates the Attribute.

The features extraction stage 500 thus generates a set of attribute probabilities 520, indicating the probability for each attribute that fraudulent activity will occur.

The exemplary machine learning techniques are based on learning patterns of compromised credentials where fraud was committed with them (the collected feedback on the "usage" of stolen credentials enables learning the risk), as well as the frequency and velocities of retrieved credentials (the volume of compromised credentials given a specific drop zone, specific target and malware has a correlation to the fraud probability and this will be taken into account in the risk modeling).

Figure 6:
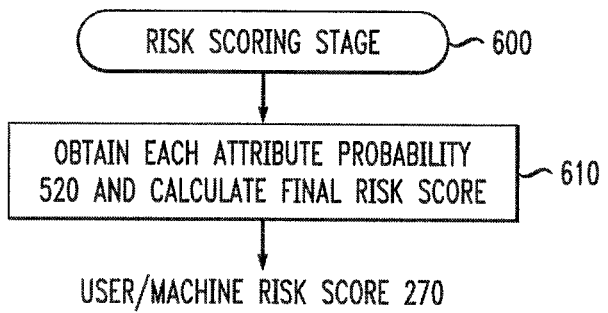
FIG. 6 is a flow diagram illustrating the risk scoring stage of FIG. 2 in further detail.

FIG. 6 is a flow diagram illustrating the risk scoring stage 600 of FIG. 2 in further detail. Generally, the risk scoring stage 600 applies machine learning modeling to correlate different elements and attributes based on the fraud feedback in the preprocessed data 460. In this manner, the risk scoring stage 600 identifies the more risky compromised credentials.

As shown in FIG. 6, the risk scoring stage 600 obtains each attribute probability 520 during step 610 and calculates a final risk score, as follows:

$$P(C = Y \mid A = a) = P(C = Y)\prod_i \frac{P(A_i = a_i \mid C = Y)}{P(A_i = a_i)}$$

where C indicates a compromise (Yes/No) and A indicates the Attribute.

The risk scoring stage 600 thus generates a risk score 270 during step 610 for each user/machine and optionally organizes the information in decreasing order of risk.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for evaluating compromised credentials, comprising the steps of:

obtaining collected data regarding previously compromised credentials that were used to commit an unauthorized activity, wherein said collected data regarding previously compromised credentials comprises attributes of a drop zone where an attacker stored said previously compromised credentials;

applying, with at least one hardware device, one or more statistical learning methods to said collected data regarding previously compromised credentials to identify one or more patterns in attributes of said previously compromised credentials;

generating, with said at least one hardware device, a risk score indicating a probability that the previously compromised credentials will be used to commit one or more additional unauthorized activities, wherein said risk score is based on said patterns and said attributes of said drop zone; and ranking the previously compromised credentials based on the risk score generated for each credential from the previously compromised credentials, wherein said attributes of said drop zone comprise one or more of an age of said drop zone, an age of records from said drop zone and an average number of new compromised credentials added per day to said drop zone.

2. The method of claim 1, further comprising the step of determining a probability for one or more attributes of said previously compromised credentials of whether fraudulent activity will occur.

3. The method of claim 1, wherein said evaluating generating step generates said risk score for one or more users and or devices.

4. The method of claim 3, further comprising the step of ordering a plurality of risk scores based on an order of risk.

5. The method of claim 1, wherein said collected data comprises attributes of malware used by said attacker to obtain said previously compromised credentials.

6. The method of claim 1, wherein said collected data comprises attributes of a device from where said previously compromised credentials were obtained.

7. The method of claim 1, wherein said collected data comprises attributes of the unauthorized activity.

8. The method of claim 1, wherein said collected data regarding said previously compromised credentials is collected from one or more of at least one anti-fraud server and at least one information source.

9. A computer program product for evaluating compromised credentials, comprising a tangible processor-readable recordable storage memory having encoded therein executable code of one or more software programs, wherein the one or more software programs when executed by the processor of the processing device implement the following steps:

obtaining collected data regarding previously compromised credentials that were used to commit an unauthorized activity, wherein said collected data regarding previously compromised credentials comprises attributes of a drop zone where an attacker stored said previously compromised credentials;

applying, with said at least one hardware device, one or more statistical learning methods to said collected data regarding previously compromised credentials to identify one or more patterns in attributes of said previously compromised credentials;

generating, with said at least one hardware device, a risk score indicating a probability that the previously compromised credentials will be used to commit one or more additional unauthorized activities, wherein said risk score is based on said patterns and said attributes of said drop zone, and ranking the previously compromised credentials based on the risk score generated for each credential from the previously compromised credentials, wherein said attributes of said drop zone comprise one or more of an age of said drop zone, an age of records from said drop zone and an average number of new compromised credentials added per day to said drop zone.

10. An apparatus for evaluating compromised credentials, comprising:

a memory; and at least one hardware device operatively coupled to the memory and configured to:

obtaining collected data regarding previously compromised credentials that were used to commit an unauthorized activity, wherein said collected data regarding previously compromised credentials comprises attributes of a drop zone where an attacker stored said previously compromised credentials;

apply, with said at least one hardware device, one or more statistical learning methods to said collected data regarding previously compromised credentials to identify one or more patterns in attributes of said previously compromised credentials;

generate, with said at least one hardware device, a risk score indicating a probability that the previously compromised credentials will be used to commit one or more additional unauthorized activities, wherein said risk score is based on said patterns and said attributes of said drop zone, and ranking the previously compromised credentials based on the risk score generated for each credential from the previously compromised credentials, wherein said attributes of said drop zone comprise one or more of an age of said drop zone, an age of records from said drop zone and an average number of new compromised credentials added per day to said drop zone.

11. The apparatus of claim 10, wherein said at least one hardware device is further configured to determine a probability for one or more attributes of said previously compromised credentials of whether fraudulent activity will occur.

12. The apparatus of claim 10, wherein said risk score is for one or more users or devices.

13. The apparatus of claim 12, wherein said at least one hardware device is further configured to order a plurality of risk scores based on an order of risk.

14. The apparatus of claim 10, wherein said collected data comprises attributes of malware used by said attacker to obtain said previously compromised credentials.

15. The apparatus of claim 10, wherein said collected data comprises attributes of a device from where said previously compromised credentials were obtained.

16. The apparatus of claim 10, wherein said collected data comprises attributes of the unauthorized activity.

17. The apparatus of claim 10, wherein said collected data regarding said previously compromised credentials is collected from one or more of at least one anti-fraud server and at least one information source.

* * * * *

UNITED STATES PATENT AND TRADEMARK OFFICE
CERTIFICATE OF CORRECTION

PATENT NO. : 9,092,782 B1  
APPLICATION NO. : 13/537506  
DATED : July 28, 2015  
INVENTOR(S) : Alex Zaslavsky et al.

Page 1 of 1

It is certified that error appears in the above-identified patent and that said Letters Patent is hereby corrected as shown below:

In the Specification

Column 3, lines 58, 59 and 60 replace "eFraud network" with --eFraud Network™--.

Column 4, lines 1, 22 and 46 replace "eFraud network" with --eFraud Network™--.

Signed and Sealed this  
Twelfth Day of April, 2016

Michelle K. Lee  
*Director of the United States Patent and Trademark Office*